United States Patent
Riseman

Patent Number: 5,163,756
Date of Patent: Nov. 17, 1992

[54] BAG CONSTRUCTION WITH AUXILIARY FLAP

[75] Inventor: David A. Riseman, Waban, Mass.

[73] Assignee: Bagcraft Corporation of America, Chicago, Ill.

[21] Appl. No.: 823,624

[22] Filed: Jan. 21, 1992

Related U.S. Application Data

[63] Continuation of Ser. No. 573,231, Aug. 24, 1990, abandoned.

[51] Int. Cl.⁵ .................. B65D 30/18; B65D 33/00
[52] U.S. Cl. ......................... 383/127; 383/104; 383/111; 383/126
[58] Field of Search ............ 383/104, 111, 126, 127, 383/124; 229/70; 206/831

[56] References Cited

U.S. PATENT DOCUMENTS

| | | | |
|---|---|---|---|
| 392,964 | 11/1888 | McCulla | 383/124 |
| 1,588,875 | 6/1926 | Curtis | 229/70 X |
| 2,129,705 | 9/1938 | Reineman | 229/70 X |
| 2,149,872 | 3/1939 | Schmidt | 383/124 |
| 2,226,943 | 12/1940 | Poppe | 229/70 X |
| 2,385,647 | 9/1945 | Poppe | 383/124 |
| 2,614,349 | 10/1952 | Barnes | 383/111 X |
| 3,227,359 | 1/1966 | Hanlon | 383/124 X |
| 3,302,861 | 2/1967 | Hiersteiner | 229/70 X |
| 3,804,323 | 4/1974 | Bemel | 206/831 X |
| 4,993,845 | 2/1991 | Faltynek | 383/111 X |

FOREIGN PATENT DOCUMENTS

| | | | |
|---|---|---|---|
| 6398 | of 1899 | United Kingdom | 383/106 |
| 1034170 | 6/1966 | United Kingdom | 229/70 |
| 2074541 | 11/1981 | United Kingdom | 383/127 |

Primary Examiner—Stephen Marcus
Assistant Examiner—Jes F. Pascua
Attorney, Agent, or Firm—Hill, Van Santen, Steadman & Simpson

[57] ABSTRACT

There is disclosed herein a flexible bag in which the back panel is defined by inner and outer overlapping sections that overlap to form a back seam. The outer section defines a removable section which has a first perforation generally parallel to the back seam and an edge that is generally parallel to the bag bottom and intersects the first perforation. Alternatively, a second perforation may be provided along the edge. The outer panel is about as wide as the bag and the removable section is less than one-half the width of the outer panel. The first perforation is positioned between the back seam and side edge of the removable section. The first perforation may be adjacent the back seam and the second perforation is adjacent the bag bottom.

A blank for forming said bag from a web is also disclosed.

4 Claims, 2 Drawing Sheets

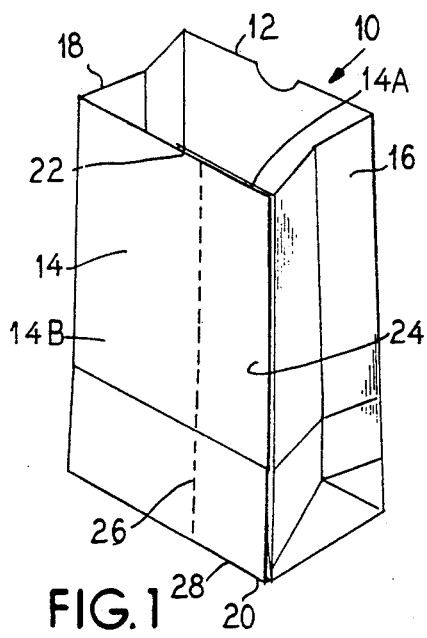
FIG.1
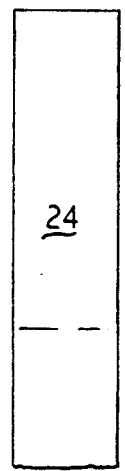
FIG.2
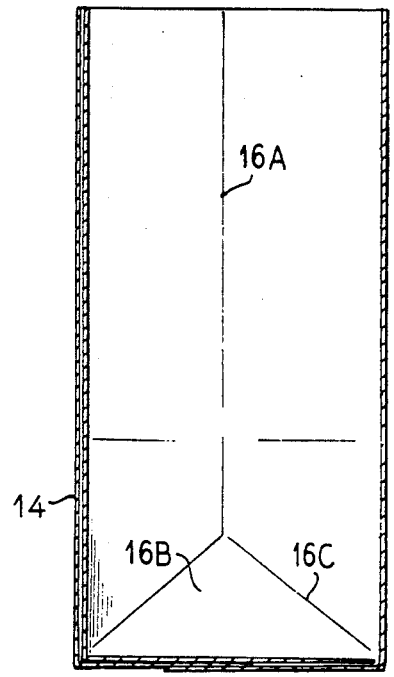
FIG.3
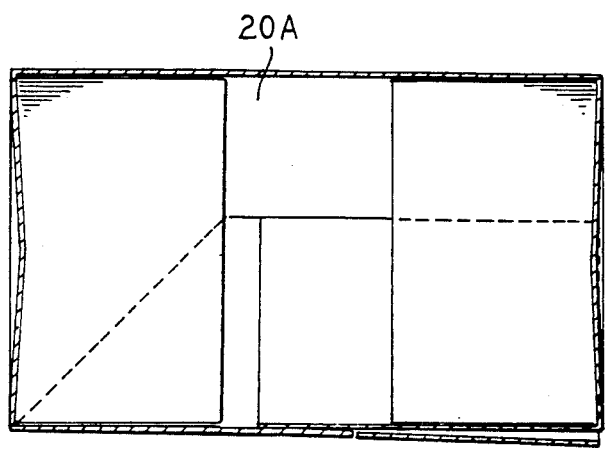
FIG.4
FIG.5
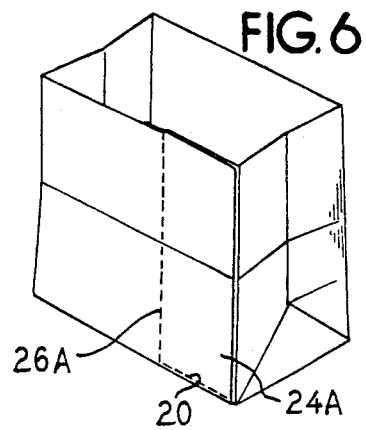
FIG.6
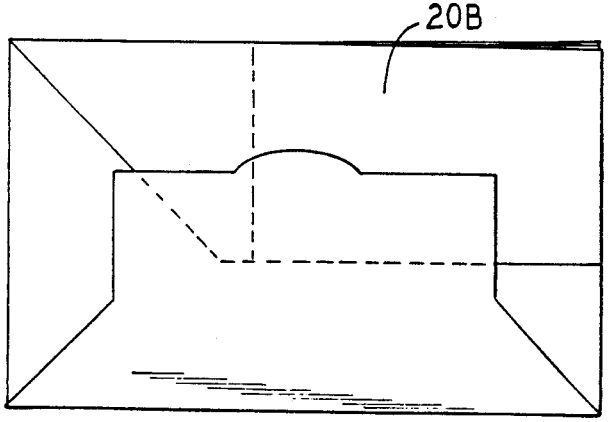

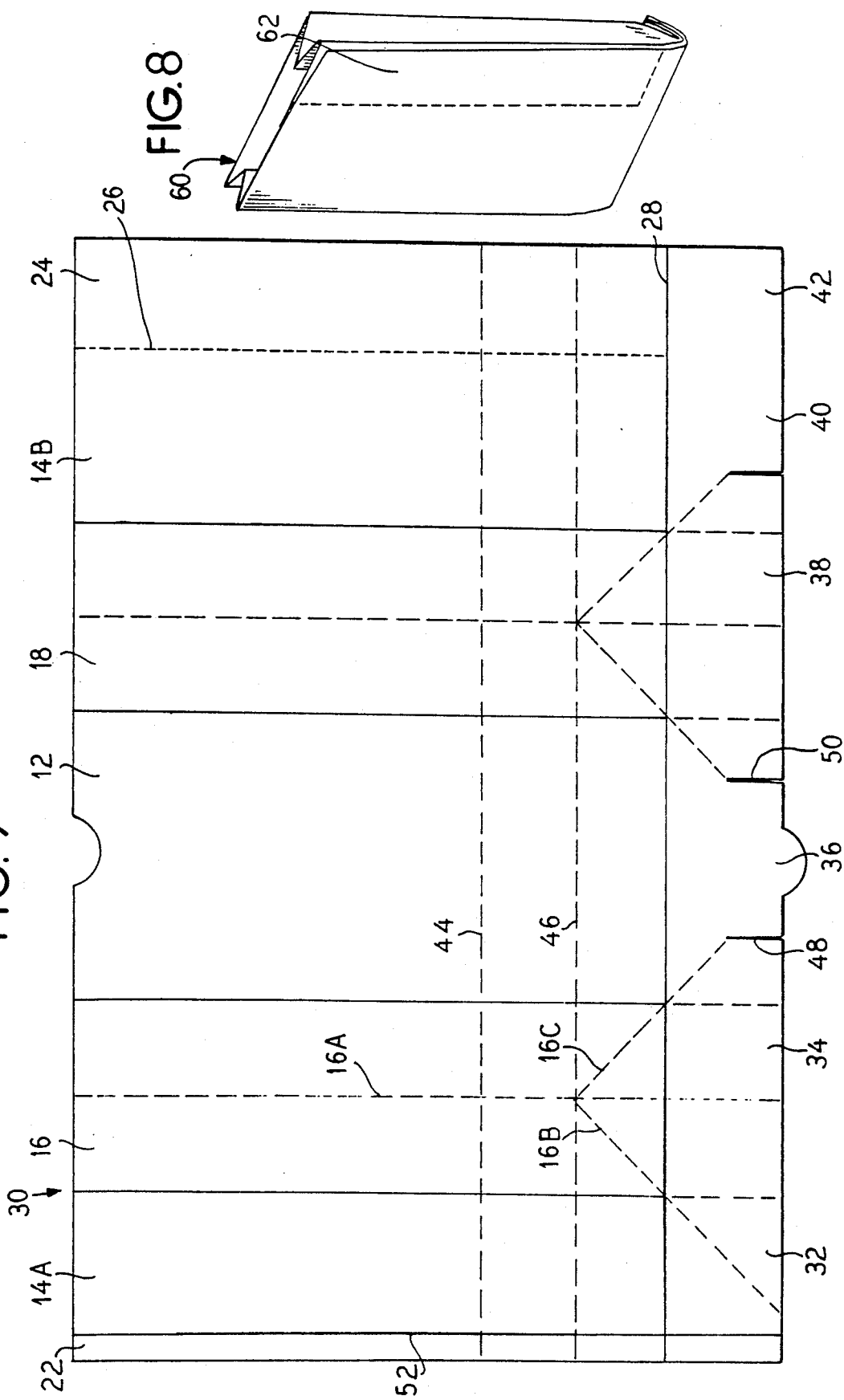

BAG CONSTRUCTION WITH AUXILIARY FLAP

This is a continuation of application Ser. No. 573,231, filed Aug. 24, 1990 now abandoned.

BACKGROUND OF THE INVENTION

This invention relates to flexible packaging particularly bags, and more specifically, to paper bags which carry indicia or markings on removable sections.

Containers that carry indicia, such as advertising or coupons and in particular removable sections, are known in the art. See, for example, U.S. Pat. Nos. 1,116,043; 1,915,341; 2,301,618; 2,469,343; 2,967,010; 3,214,075; 3,207,418; 4,042,110; 4,108,350; 4,171,085; 4,345,393; 4,417,609; 4,520,958; 4,545,781; 4,872,555 and Swiss Patent No. 282907.

However, it is desirable to form a removable section on a flexible paper bag in such a manner as to insure the structural integrity of the bag before and after the removable section is removed. Moreover, such a bag and section should be made from a single web of starting material on existing bag-making equipment. Furthermore, the removable section should be constructed to carry various types of indicia depending upon the use and construction of the section. For example, information can be sent by facsimile for ordering purposes.

Thus it is an object of this invention to provide a removable section in connection with a flexible paper bag.

Another object of this invention is to form the bag and removable section from a single web of starting material and in connection with existing bag-making equipment known in the bag-making art.

Yet another object of this invention is to provide a flexible paper bag having a removable section in which the section and indicia thereon coordinate to achieve a desired objective.

These and other objects of this invention will become apparent from the following disclosure and appended claims.

SUMMARY OF THE INVENTION

The foregoing objects are met by a flexible paper bag having a removable section or flap formed on the back panel at the back wall seam and a perforation for removal. A blank is provided for forming the bag with the removable section from a unitary web using known bag-making apparatus. The section may carry indicia related to the function of the section.

BRIEF DESCRIPTION OF THE DRAWINGS

FIG. 1 is a perspective view of an opened flat-bottom bag having the removable section;

FIG. 2 is an elevational view of the removable section by itself;

FIG. 3 is a side elevational view of the opened bag of FIG. 1;

FIG. 4 is a plan view of the bottom of the bag as seen from the inside of the bag;

FIG. 5 is a plan view of the bottom of the bag as seen from outside the bag;

FIG. 6 is a perspective view of fragment of a bag of the type in FIG. 1 in which the removable section is perforated along the bottom of the bag;

FIG. 7 is a plan view of a blank from which the bag is formed; and

FIG. 8 is a side view of a fragment of a bag having a pinch bottom.

DESCRIPTION OF THE PREFERRED EMBODIMENT

Referring now to FIG. 1, there is shown an opened bag 10 of the flat-bottom style. The bag is constructed from a formed, cut, folded and glued unitary blank. The bag includes interconnected front 12, back 14, side 16 and 18, and bottom 20 panels. The back is formed by overlapping parts of the web and adhering them along a back seam 22. The bottom 20 is formed by folding the ends or extensions of the panels. The inside 20A of the bottom is shown in FIG. 4. The outside 20B of the bottom is shown in FIG. 5.

Each of the side panels 16 and 18 are gussetted as shown by fold lines, such as 16A, 16B and 16C, for folding the bag to a flat position for storage.

The Removable Section

The back panel 14 and a removable section 24 are formed by (a) an inner back section 14A that extends from side 16 and is greater than about one-half the width of the back panel and (b) an outer back section 14B that extends from side 18, is about the full width of the back panel and carries the removable section 24. It is seen that the outer section 14B overlaps the inner section 14A and the two sections are adhered along the generally central back seam 22.

A removable section 24, which is less than about one-half in width as the back, is formed on the outer back section of the bag. The removable section is defined by vertical perforations, such as a perforation 26, parallel to and adjacent the back seam 22 of the bag, and a bottom edge 28, and adjacent the bottom of the bag which extends between perforation 26 to the edge of the section 24 or side panel 16. The section 24 can carry various indicia, a coupon, or even multiple coupons, facsimile (fax) messages, etc., and can be removed by tearing.

The removable section 24 is formed from the blank which forms the bag and thus extends below the back panel 14 and is formed into the bottom panel 20.

An optional embodiment of the flat bottom bag is shown in FIG. 5. There the bag includes a horizontal perforation 70 that extends along the bottom edge of the removable panel 24A between the vertical perforation 26A and the side edge of the bag.

The Blank

Referring now to FIG. 7, a blank for formation of the bag as in FIG. 1 is shown. The blank 30 is divided into panels by various score lines which are shown by a solid line. Turning first to the panels as shown, the blank panels are defined as:

| | |
|---|---|
| Back - inner section | 14A |
| Side | 16 |
| Front | 12 |
| Side | 18 |
| Back - outer section | 14B |

The removable section 24 is defined by the vertical chain-style line 26 and its bottom edge or score line 28.

It is noted that each of the foregoing panels or sections includes an extension which is folded to cooperate in forming the flat bottom panel. More specifically, note the following extensions that are generally shown by dashed lines:

| Back - inner section | 32 |
|---|---|
| Side | 34 |
| Front | 36 |
| Side | 38 |
| Back - outer section | 40 |
| Removable section | 42 |

Most of the panels and extensions are separated or defined by fold or score lines. However, the removable section is defined by the perforation 26 and edge 28. But its extension 42 and the adjacent back extension 40 are unitary and cooperate to define the bottom panel. The bottom panel, such as 20, is formed by the folded extensions of the other panels.

This blank is fabricated and formed with standard manufacturing and equipment.

Moreover, this bag can be folded and filled using standard folding apparatus.

The solid dark lines in FIG. 6 generally indicate the panel forming score lines that are impressed into the blank. The dashed lines, such as the gusset forming folds 16A, 16B and 16C, indicate fold forming lines that are impressed into the bag for use in folding the bag to the open or to the storage position. The lines 44 and 46 represent selected horizontal bag fold lines that cooperate in bag folding. The cut lines 48 and 50 in extension 36 cooperate with the gusset forming lines and cooperate in defining a tab in section 36 that is used in gluing the bag closed.

It is noted that the removable flap section 24 and its extension 42 are not glued to the bag and are formed by, in a sense, extending the back outer section 14B sideways.

Thus the removable flap can be viewed as being formed by adding the structure and concept for the flap to standard bag-forming technology, thereby optimizing the use of existing equipment and technology.

The line 52 on the left-hand side of the blank defines a back edge area where the back sections are overlapped and glued to form the back seam 22.

In FIG. 8 a pinch bottom bag 60 is shown which also has a removable section such as 62.

Although the invention has been described with respect to preferred embodiments, it is not to be so limited as changes and modifications can be made which are within the full intended scope of the invention as defined by the appended claims.

I claim:

1. A flexible bag for carrying articles which is of the flat-bottom type and which includes front, back, gussetted side and bottom panels with the bottom panel movable from a closed position to an open position transverse to said back, front and side panels, and which the back panel includes an overlapping generally centrally positioned seam and said bag further including a removable section: (a) extending from the center seam toward an adjacent side panel; (b) being defined by (i) a section-forming perforation which is generally parallel to the seam and extending between the top and bottom of the bag and (ii) an edge generally parallel to the junction of the back and bottom panels and intersecting the section forming perforation; (c) wherein said perforation is the only section-forming perforation; and (d) having an extension which is integral with the removable section which extension cooperates in forming the bottom panel.

2. A unitary blank formed from a web for use in forming a flexible bag, which blank includes a plurality of panel defining score and fold lines which define back, front, said and flat bottom panels and wherein the improvement comprises said back panel having an inner portion and an outer portion, wherein the outer portion is wider than the inner portion, said portions adapted to overlap and be adhered together along a generally centrally positioned back seam, said outer portion including a removable section having a perforation constructed to be positioned generally parallel to the back seam and said removable section being less than about one-half as wide as the back pane, being formed so as to overlap the inner part of the back and extending to the edge formed by the inner portion of the back and the adjacent side panel so as to form an off-center positioned removable section and said removable section includes an extension which cooperates in forming said bottom panel and said extension and removable section having a common fold line for defining an edge thereof and said fold line being transverse to the said perforation and said perforation being the only removable-section defining perforation.

3. A flexible bag for carrying articles which is of the V- or pinch-bottom type and which include front, back and side panels which cooperate to form a bottom movable from a closed position to an open position and which the back panel includes an overlapping generally centrally positioned seam and said bag further including a removable section: a) extending from the center seam toward an adjacent side panel; (b) being defined by (i) a section-forming perforation which is generally parallel to the seam and extending between the top and bottom of the bag and (ii) an edge generally parallel to the junction of the back panel and bottom and intersecting the section-forming perforation; (c) wherein said perforation is the only section-forming perforation; and (d) having an extension which is integral with the removable section which extension cooperates in forming the bottom.

4. A unitary blank formed from a web for use in forming a flexible V-shaped or pinch-bottom bag type, which blank includes a plurality of score and fold lines which define back, front and side panels and a bottom and wherein the improvement comprises said back panel having an inner portion and an outer portion, wherein the outer portion is wider than the inner portion, said portions adapted to overlap and be adhered together along a generally centrally positioned back seam, said outer portion including a removable section having a perforation constructed to be positioned generally parallel to the back seam and said removable section being less than about one-half as wide as the back panel, being formed so as to overlap the inner part of the back and extending to the back edge formed by the inner portion of the back and the adjacent side panels so as to form an off-center positioned removable section and said removable section includes an extension which cooperates in forming said bottom and said extension and removable section having a common fold line for defining an edge thereof and said fold line being transverse to the said perforation and said perforation being the only removable section-defining perforation.

* * * * *